Feb. 13, 1940.  G. POTAPENKO  2,190,321
METHOD AND APPARATUS FOR GEOPHYSICAL PROSPECTING
Filed Dec. 22, 1937  6 Sheets-Sheet 1
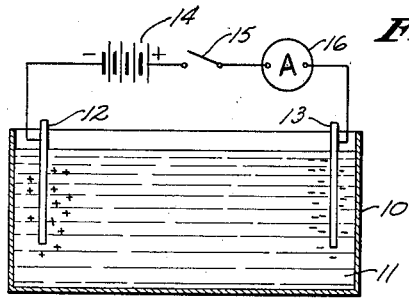
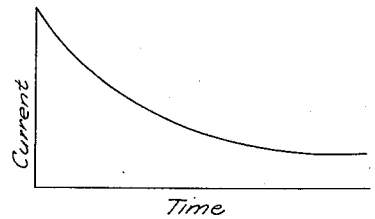
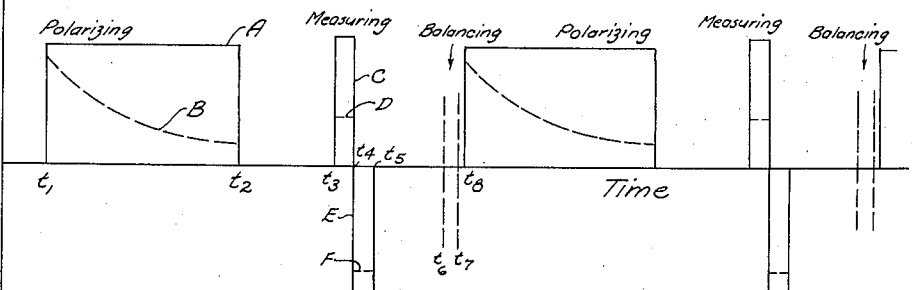
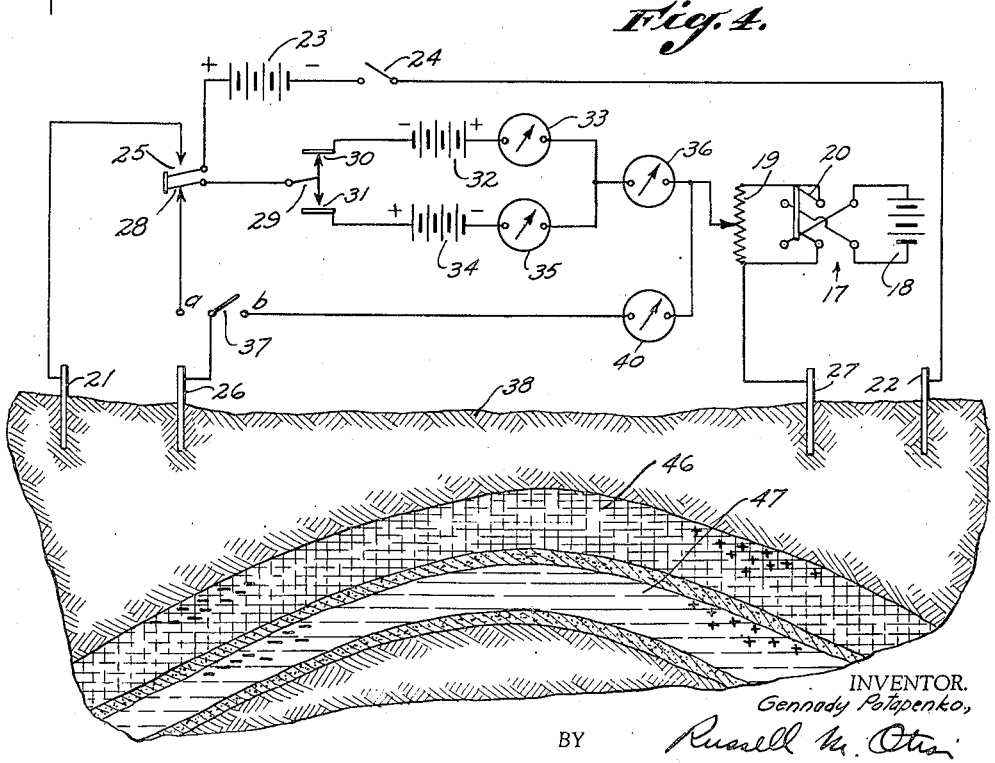
INVENTOR.
Gennady Potapenko,
BY
ATTORNEY.

Feb. 13, 1940.   G. POTAPENKO   2,190,321
METHOD AND APPARATUS FOR GEOPHYSICAL PROSPECTING
Filed Dec. 22, 1937   6 Sheets-Sheet 2
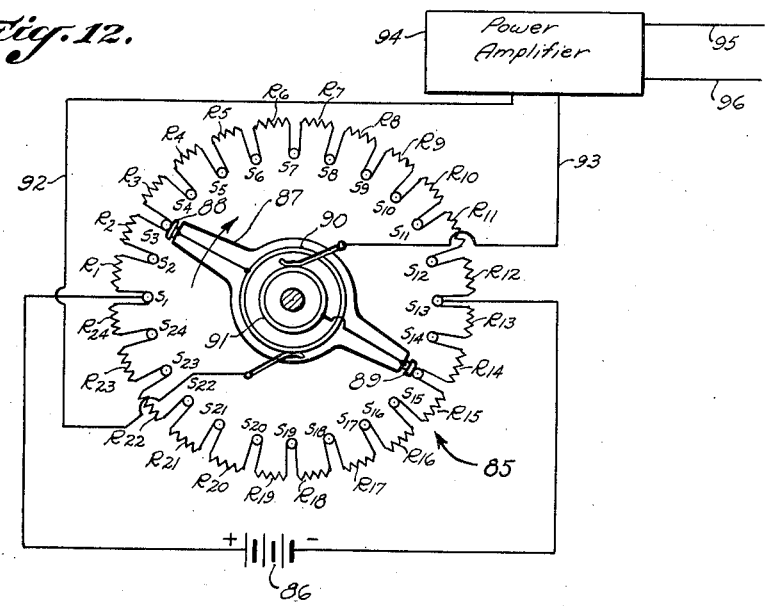
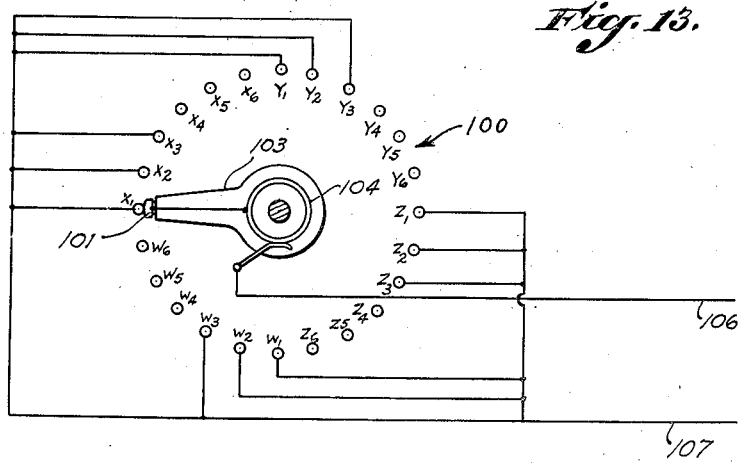
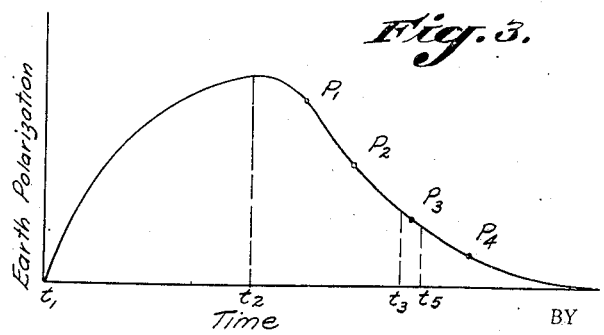
INVENTOR.
Gennady Potapenko,
BY Russell M. Otis
ATTORNEY.

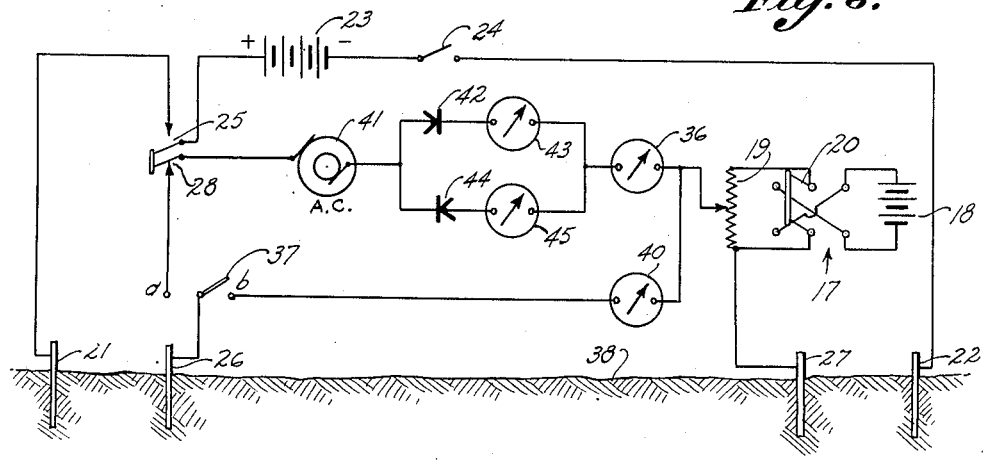
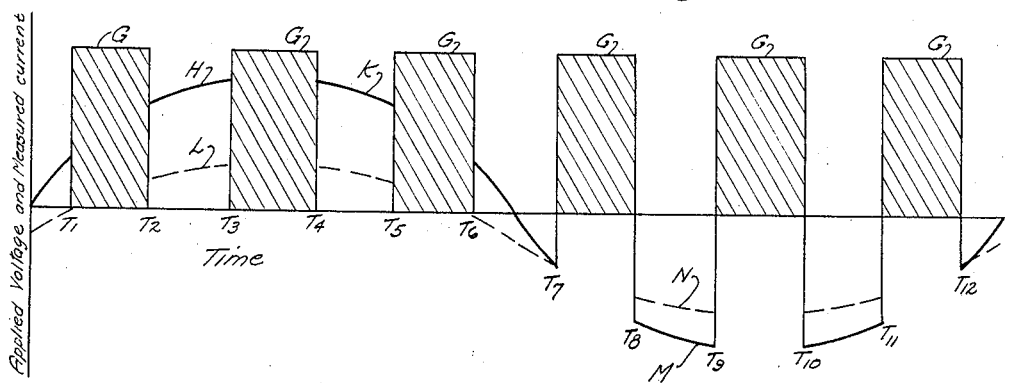
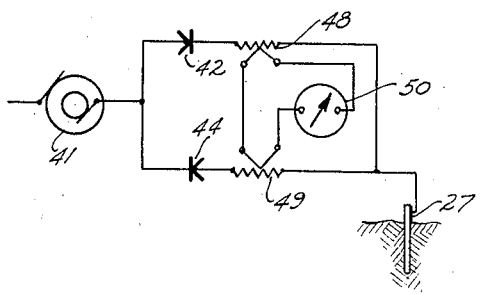
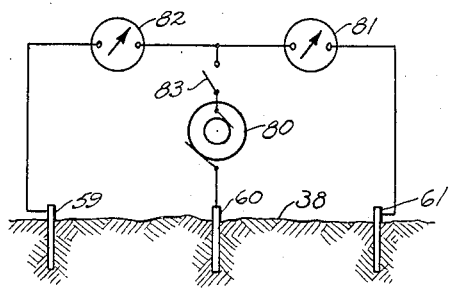

Feb. 13, 1940.  G. POTAPENKO  2,190,321

METHOD AND APPARATUS FOR GEOPHYSICAL PROSPECTING

Filed Dec. 22, 1937  6 Sheets-Sheet 4

INVENTOR.
Gennody Potapenko,
BY Russell M. Otis
ATTORNEY.

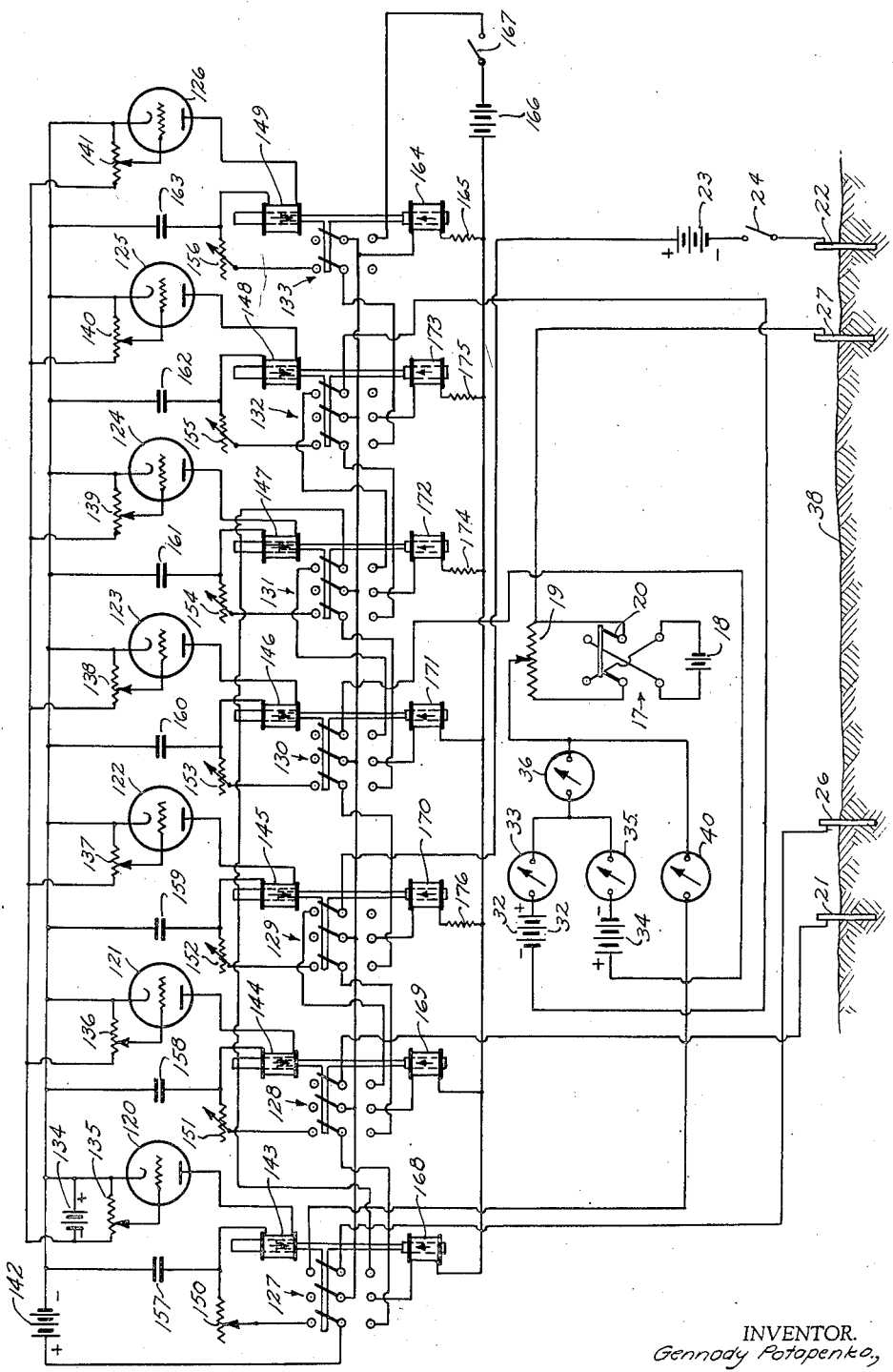

Patented Feb. 13, 1940

2,190,321

UNITED STATES PATENT OFFICE

2,190,321

METHOD AND APPARATUS FOR GEOPHYSICAL PROSPECTING

Gennady Potapenko, Pasadena, Calif., assignor to Geo-Frequenta Corporation, a corporation of Delaware Application December 22, 1937, Serial No. 181,143

14 Claims. (Cl. 175—182)

My invention relates to a method and apparatus for geophysical prospecting.

It is an object of my invention to provide a method which is of assistance in determining the structure of the underlying earth and in locating certain bodies within the earth which differ from their surroundings in electrolytic polarization characteristics.

Another object is to provide a method of determining the electrolytic polarization characteristics of underground structure, whereby the structure may be identified.

Another object is to provide a method of measuring the polarization of the earth indirectly.

A further object of the invention is to provide a method of determining the differences in polarization between different parts of the earth.

Still another object of the invention is to provide apparatus whereby these methods may conveniently be carried out.

The manner in which I attain these and other apparent objects will be clear from a consideration of the following description taken in connection with the accompanying drawings, of which, Fig. 1 shows an apparatus for demonstrating the basic phenomena underlying the invention.

Fig. 2 shows the relation of current and time after closing the switch in the apparatus of Fig. 1 with a non-oil-bearing electrolyte in the tank.

Fig. 3 shows the manner of variation of the polarization of the earth when a constant polarizing electromotive force is applied during the interval $t_1$ $t_2$.

Fig. 4 shows diagrammatically an apparatus for performing my method of geophysical prospecting.

Fig. 5 shows the manner in which the E. M. F.'s and currents are varied in the apparatus of Fig. 4.

Fig. 6 shows diagrammatically an alternative apparatus for performing my method of geophysical prospecting.

Fig. 7 shows the manner in which the E. M. F.'s and currents vary in the apparatus of Fig. 6.

Fig. 8 shows diagrammatically an alternative arrangement of measuring circuit for the apparatus of Fig. 6.

Figure 9:
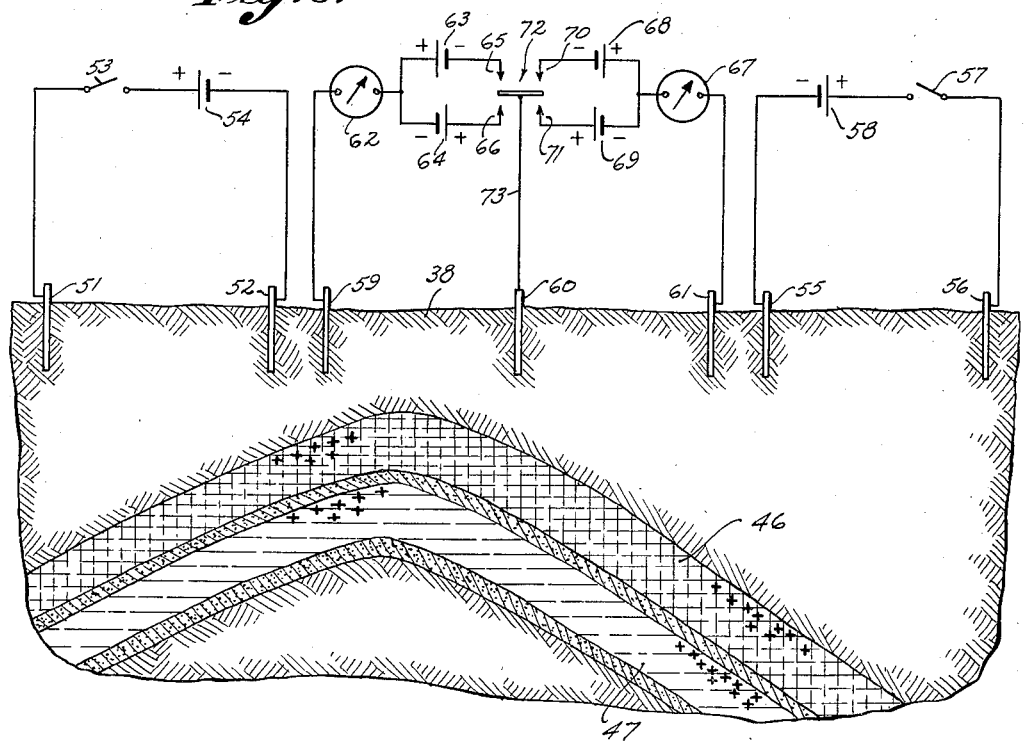

Fig. 9 shows diagrammatically an alternative arrangement of apparatus for geophysical prospecting.

Figure 10:
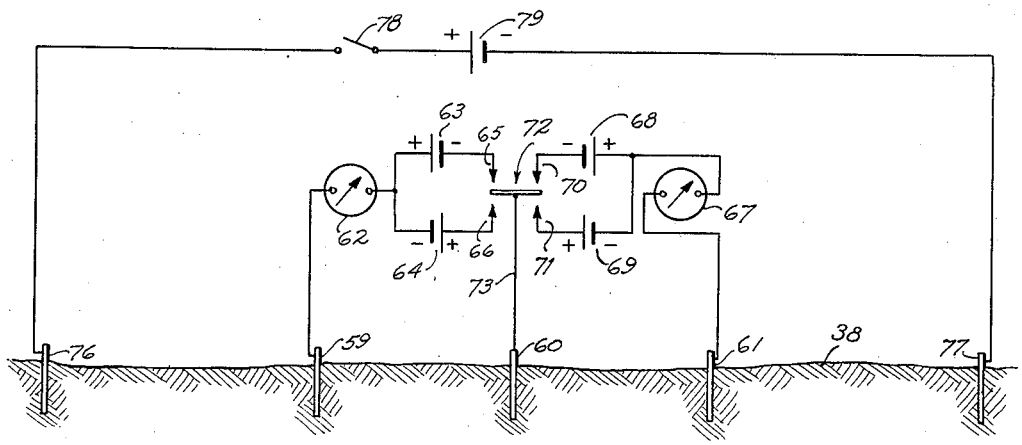

Fig. 10 shows diagrammatically an alternative arrangement of apparatus for geophysical prospecting.

Fig. 11 shows diagrammatically an alternative measuring circuit for the apparatus of Fig. 9 or Fig. 10.

Fig. 12 shows diagrammatically a low frequency alternating current generator employed in my apparatus.

Fig. 13 shows diagrammatically a distributor type relay which I may employ in my apparatus.

Fig. 14 shows diagrammatically a complete apparatus for performing the functions of the apparatus of Fig. 4.

Figure 15:
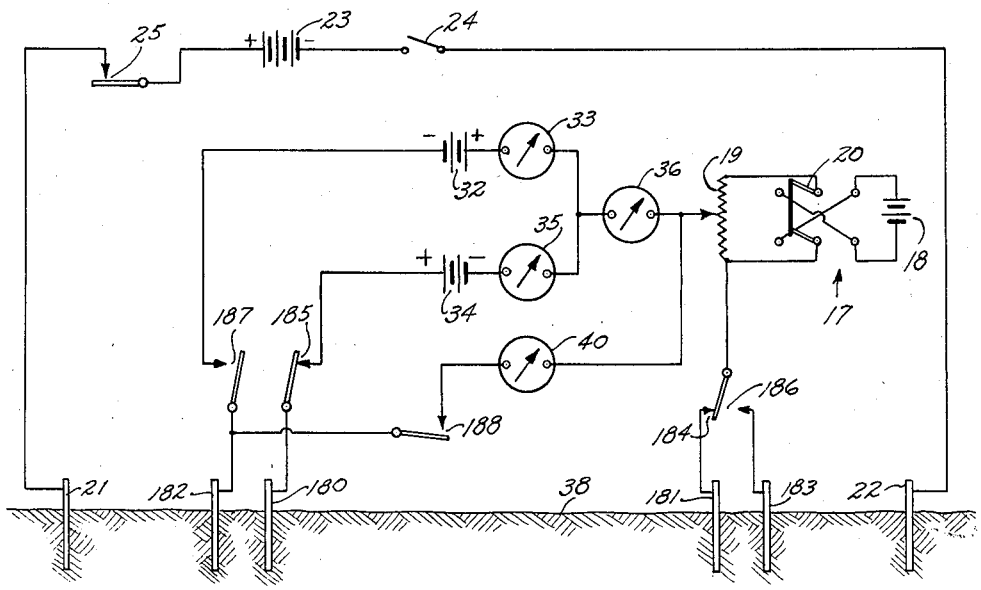

Fig. 15 shows an alternative apparatus for geophysical prospecting.

The method of my invention is based upon the phenomenon of electrolytic polarization. Basically, the phenomenon can be considered to be demonstrated by the apparatus of Fig. 1. Assume a tank 10 containing an electrolyte 11. In contact with the electrolyte are the spaced electrodes 12 and 13 connected in a circuit with a battery 14, switch 15, and current measuring instrument 16, the negative pole of the battery being connected to electrode 12. When the switch 15 is closed, current starts to flow in the circuit but in case of most electrolytes the current almost immediately begins to decrease as shown in Fig. 2 due to the polarization of the electrolyte at inhomogeneities existing therein. In the case of oil a noticeable decrease of current due to polarization takes place only after a delay of about one second. The polarization in the arrangement of Fig. 1 exhibits itself as a concentration of negatively charged ions near the surface of positive electrode 13 and a corresponding concentration of positively charged ions near the surface of negative electrode 12, as shown in Fig. 1, the electrode surfaces constituting inhomogeneities in the electrolytic circuit. These concentrations of oppositely charged ions in the electrolyte make it more difficult for current to pass through the electrolyte and in effect constitute a counter-electromotive force in the circuit in opposition to that of the battery 14. This E. M. F. of polarization gradually builds up to an equilibrium value and reduces the current correspondingly as shown in Fig. 2.

When, in the arrangement of Fig. 1, the circuit is broken after polarization has built up, the E. M. F. of polarization will exhibit itself and be measurable at the electrodes. This E. M. F. of polarization, however, will rather quickly discharge itself by passage of polarization currents through the electrolyte and will decrease to nothing. In Fig. 3 is shown the manner in which the electrolytic polarization is built up during the time interval $t_1 t_2$ while a polarizing E. M. F. is applied and the manner in which the polarization decreases to nothing in the discharge period following interruption of the polarizing E. M. F.

Since the conduction of electric current through the earth takes place for the most part electrolytically, similar phenomena are exhibited when electrodes electrically connected in the earth are energized. But while these phenomena take place in the earth as in the simple experiment of Fig. 1, they are altered and complicated by the complexity of the structure of the earth. The earth generally consists of many strata and lenticular deposits of many different kinds of material having different conductivities and polarization characteristics. These strata and deposits constitute inhomogeneities in the electrolytic circuit, at the boundaries of which polarization charges are built up. For example, metallic ore deposits exhibit intense polarization effects, and the polarization of an oil bearing earth differs from non-oil-bearing earth around it. Polarization may also be built up within a stratum or a deposit when the stratum or deposit is not homogeneous. These facts demonstrate that polarization effects can be an effective tool in determining the structure and character of underlying earth. My present invention enables one to very accurately measure polarization of the earth and its dependence upon time, and is free from errors which generally accompany any method wherein transients or discontinuous observations are involved. In my method the polarization of the earth traversed by electric current is preferably continuously indicated, and this continuing condition of equilibrium during the making of an observation makes for high accuracy which is necessary if small differences due to deep-lying structure are to be significantly found.

In the practice of my invention, I preferably polarize the earth by means of a unidirectional electromotive force in connection therewith by means of spaced electrodes, and measure the polarization, thus set up, by its effect upon two successive oppositely directed currents traversing substantially the same path. In one form of my invention, diagrammatically illustrated in Fig. 4, I may electrically connect to the earth 38 a pair of spaced electrodes 21 and 22. In circuit with these electrodes is a source of direct current 23, a switch 24, and a relay switch 25. While I may connect to electrodes 21 and 22 the circuit about to be described, provided the electrodes 21 and 22 are of the non-polarizing type, I prefer to connect it to additional non-polarizing electrodes 26 and 27 electrically connected to the earth preferably between, but not close to, electrodes 21 and 22, respectively, although it will be understood that the measuring electrodes 26 and 27 may be moved about to various locations to explore the entire region. A double-throw switch 37, when in position $a$, connects electrode 26 through relay switch 28 to the relay 29 comprising switches 30 and 31. Through switches 28 and 30 are connected in the circuit source 32 of direct current and direct current measuring instrument 33, while through switches 28 and 31 are connected in the circuit source 34 of direct current and direct current measuring instrument 35. One terminal of each of instruments 33 and 35 are connected together and through direct current measuring instrument 36 and balancing circuit 17 to the electrode 27. The switch 37, when in position $b$, connects the electrode 26 through direct current measuring instrument 46 with a point between the balancing circuit 17 and the instrument 36. The balancing circuit 17 comprises a direct current source 18 and potentiometer 19 connected through a reversing switch 20 in such a way that a variable potential difference in either direction may be inserted into the measuring circuit. The relay switches 25 and 28 are adapted to be closed alternately as are also the relay switches 30 and 31. The timing of these relay events is definitely determined as will hereinafter be explained. It will be understood that these relays are shown purely diagrammatically, and devices of various kinds may be employed to provide the connections required, some of which will be hereinafter described in detail. The polarities of sources 32 and 34 are opposite so that when switches 28 and 30 are closed and switch 37 is in position $a$, source 32 is connected in circuit with electrodes 26 and 27 with the result that electrodes 26 and 27 have polarities opposite to those previously existing at electrodes 21 and 22, respectively; while when switches 28 and 31 are closed, switch 37 being closed in position $a$, source 34 is connected in circuit with electrodes 26 and 27 to energize these electrodes with polarities opposite to those existing when source 32 is in circuit, and therefore in the same direction as the polarities previously existing at electrodes 21 and 22 respectively.

In operating the apparatus of Fig. 4, I preferably first balance out the earth currents normally present in the earth by throwing switch 37 to position $b$ and varying potentiometer 19, and if necessary reversing switch 20, until no current is read on meter 46. Switch 37 is then thrown to position $a$, switch 24 is closed, and the relay switches 25, 28, 30 and 31 are caused to function repeatedly to produce the desired events. In Fig. 5 is shown the manner in which the polarizing E. M. F. applied to electrodes 21 and 22, and the measuring E. M. F.'s applied to electrodes 26 and 27 may be varied with time. The relay switch 25 may close at time $t_1$ (Fig. 5) and remain closed until time $t_2$, causing the E. M. F. of source 23 to be applied to electrodes 21 and 22 and to vary as curve A. During this time the current in the circuit may be varying as dotted curve B due to the polarization of the earth. Then after an interval of time $t_2 t_3$, during which time switches 25 and 28 are both open, the measuring circuit is connected. The switches 28 and 31 are closed and remain closed for a brief interval until time $t_4$ whereupon switch 31 opens and switch 30 closes and remains closed until time $t_5$ when both switches 30 and 28 open. At time $t_6$ switch 25 again closes and the cycle is repeated. In the interval $t_3 t_4$ an E. M. F. C is being applied to a portion of earth to which the polarizing E. M. F. A was applied. Hence in this interval the resultant electric current measured on instrument 35 is opposed by the previously set up E. M. F. of polarization and, in consequence, is relatively small as indicated by the dotted line D. In the immediately following time interval $t_4 t_5$ an E. M. F. E is being applied to the same portion of earth, but since this E. M. F. is in the same direction as the counter E. M. F. of polarization previously set up in the earth during interval $t_1 t_2$, the resultant current flowing during interval $t_4 t_5$, measured on instrument 33, will be assisted by the polarization of the earth and will, in consequence, be higher as indicated by the dotted line F. The intervals $t_3 t_4$ and $t_4 t_5$ are preferably made equal, very short, and immediately adjacent so that there is no appreciable change in earth polarization during the measuring period $t_3$ $t_5$. It will be seen that polarization of the earth exhibits itself in a greater current in the meter 33 than in the meter 35 during the times over which these currents flow. Now if the cycle is repeated for a large number of times the system comes to equilibrium and the instruments 33 and 35 read the average of their currents over the cycle.

It is then a simple matter to compare the average of currents F and D over the cycle, measured in instruments 33 and 35, respectively, and if current F is greater than current D, polarization exists in the earth and the amount of the difference is a measure of the degree of polarization existing in the interval $t_3$ $t_5$. In order to compare these two currents automatically I provide the ballistic current measuring instrument 36 which is so connected that both currents F and D pass through it. The instrument 36 therefore indicates the difference between currents F and D and therefore directly indicates the degree of polarization existing. Although all three instruments 33, 35 and 36 may be employed together in the circuit, as shown, only the instrument 36 need be read.

The relays connecting the polarizing and measuring circuits are preferably adapted to permit changing of the interval $t_1$ $t_2$ to polarize for a longer or shorter time; changing the interval $t_2$ $t_3$ to measure the polarization at different stages of its discharge; and changing intervals $t_3$ $t_4$, $t_4$ $t_5$, and $t_5$ $t_8$.

Since the normal earth currents balanced out by balancing circuit 17 may change during a test, I prefer to rebalance the earth currents just prior to the beginning of each cycle, in the short time interval $t_6$ $t_7$. This is accomplished by making the switch 37 a relay switch and causing it to connect to $b$ position at time $t_6$, and at time $t_7$ to return to $a$ position. The potentiometer 19 is kept adjusted to a position in which no indication is noted on meter 40. Preferably, the time $t_2$ $t_3$ is made long enough for the polarization existing in the earth to substantially completely discharge itself before the beginning of a new cycle, and under such circumstances the interval of balancing $t_6$ $t_7$ comes when there is no polarization to affect the indication of meter 40. I may, however, make the interval $t_2$ $t_3$ shorter than the time required for polarization to completely discharge itself, and in this case the adjustment of potentiometer 19 to result in zero current through meter 40 during the interval $t_6$ $t_7$ effectively balances out in the measuring circuit also the effect of the polarization remaining at the beginning of the next cycle.

I preferably measure the earth polarization as above described at each of a plurality of times during the discharge of polarization. In Fig. 3, the measuring period $t_3$ $t_5$ is shown located at a time when the polarization is $P_3$. The measuring period is in additional tests located at various times during the discharge of polarization so as to measure polarizations $P_1$, $P_2$, $P_4$, etc. A sufficient number of such observations are made to allow the plotting of a complete polarization discharge curve.

In the apparatus of Fig. 4, if the electrodes 26 and 27 are not perfectly non-polarizing, a very small error may arise in measuring the currents D and F due to the fact that the small polarization present at the electrodes during time interval $t_3$ $t_4$ is not immediately discharged and an opposite polarization is not immediately built up when the E. M. F. reverses at time $t_4$. In order to avoid any possible error due to this cause, I may employ the circuit illustrated in Fig. 15. The same polarizing circuit is employed including electrodes 21 and 22, direct current source 23, switch 24 and relay switch 25. Two pairs of measuring electrodes 180, 181, and 182, 183 are employed, all electrically connected to the earth, the electrodes 180 and 182 being relatively near together and the electrodes 181 and 183 being relatively near together. The electrodes 180 and 182 are shown closer to electrode 21 than to electrode 22. The electrodes 180 and 181 are adapted to be connected through a measuring circuit including the balancing circuit 17, instrument 36, instrument 35, and source 34 by the relay switches 184 and 185. The electrodes 182 and 183 are likewise adapted to be connected through a measuring circuit including the balancing circuit 17, instrument 36, instrument 33, and source 32 by relay switches 186 and 187. The meter 40 on which earth currents are read is connected in circuit with the electrodes 182 and 183 and the balancing circuit 17 by relay switches 186 and 188. The polarities of the various direct current sources are the same as stated in connection with Fig. 4.

The sequence of relay switch events is as follows: Assume relay switches 25, 185, 186, 187 and 188 open, relay switch 184 closed, and switch 24 closed. At time $t_1$ the switch 25 closes, initiating the polarizing period; and at time $t_2$ the switch 25 opens. At time $t_3$ the switch 185 closes. At time $t_4$ the switches 184 and 185 open and switches 186 and 187 close. At time $t_5$ switch 187 opens. At time $t_6$ the switch 188 closes. At time $t_7$ the switches 188 and 186 open and switch 184 closes. At time $t_8$ the switch 25 closes and the entire sequence is repeated. It will be understood that the current D will be measured on instrument 35 and is passed through electrodes 180 and 181, while current F will be measured on instrument 33 and is passed through electrodes 182 and 183. The difference of currents F and D which measures the polarization of the earth will be indicated on instrument 36 as in Fig. 4. Since the oppositely directed currents D and F pass through different pairs of electrodes, no error results from any slight polarization at the electrodes.

An alternative system involving the principle of intermittently polarizing the earth and measuring the polarization by application of successive electromotive forces of opposite direction, is that illustrated in Figs. 6 and 7. In this arrangement the polarizing circuit is the same as in Fig. 3 and includes electrodes 21 and 22 electrically connected to the earth 38 and in circuit with relay switch 25, source of direct current 23 and switch 24. The measuring circuit includes, as in Fig. 3, the electrodes 26 and 27, switch 37 in its $a$ position, and relay switch 28. In this case, however, the circuit proceeds from the switch 28 to a source of preferably relatively low frequency alternating current 41 and thence to two branched circuits in parallel, the other ends of which are connected to electrode 27 through direct current measuring instrument 36 and balancing circuit 17. In one branch is the rectifier 42, permitting current to pass toward the electrode 27, through the direct current measuring instrument 43. In the other branch is the rectifier 44, permitting current to pass away from electrode 27, through the direct current measuring instrument 45. The switch 37, in its *b* position, connects the electrode 26 to a point between instrument 36 and balancing circuit 17.

In operating the apparatus of Fig. 6, I preferably first balance out the normal earth currents by throwing switch 37 to *b* position and varying the potentiometer until no current is indicated by the meter 40. Switch 37 is then thrown to position *a*, switch 24 is closed, and the relay switches 25 and 28 are caused to function to produce the desired events. The relay switches are adapted and are adjusted to connect the polarizing and measuring circuits at certain time intervals which may be as in Fig. 7. At time $T_1$ switch 28 opens and switch 25 closes, applying a unidirectional E. M. F. G. The switch 25 remains closed until time $T_2$ when it opens and switch 28 closes, applying the E. M. F. H. which at that particular time is being produced by the alternating current source 41. At time $T_3$ switch 28 opens and switch 25 closes, again applying the unidirectional polarizing E. M. F. G. At time $T_4$ the relay switches again operate, cutting off the polarizing E. M. F. and applying the E. M. F. K of the alternating current source 41 then existing. Similarly the relay switches open and close to apply the unidirectional E. M. F. G during time intervals $T_5$ $T_6$, $T_7$ $T_8$, $T_9$ $T_{10}$, and $T_{11}$ $T_{12}$, while the E. M. F. of the alternating current source is applied during the intervals $T_6$ $T_7$, $T_8$ $T_9$, $T_{10}$ $T_{11}$, with values which may exist at these particular intervals. It will be noted that from a little before $T_1$ to a little after $T_6$ the E. M. F. due to the alternating current source 41 is positive and directed so as to cause current to flow through the earth in the same direction as the E. M. F. G due to the unidirectional source 23, but that from a little before $T_7$ to a little after $T_{12}$ the E. M. F. due to source 41 is in the opposite direction.

During the periodic intervals in which the unidirectional E. M. F. G is applied, shown shaded in Fig. 7, polarization is built up in the earth, and during the intervening periods it is partially discharged. Over a large number of cycles, the degree of polarization reaches an equilibrium value which affects the current due to any other applied E. M. F. For example, during the interval $T_2$ $T_3$ the applied E. M. F. H is opposite in direction to the polarization built up in the earth and, in consequence, the resultant current L, indicated by a dotted line is relatively small, while in the interval $T_8$ $T_9$ the applied E. M. F. M is in the same direction as the E. M. F. of polarization built up in the earth and polarization therefore assists the passage of current, resulting in a proportionately large current N which, however, is opposite in sign to current L. The average of current L is indicated on instrument 45, and the average of current N on instrument 43. The instruments 43 and 45 are preferably so designed as to indicate only the average of the currents passing through them over the entire cycle of alternating current and not to vary their indications with each individual interval. One measures the degree of polarization of the earth, then, by determining the difference between the current indicated by instrument 43 and that indicated by instrument 45.

In order to indicate directly the degree of polarization of the earth by means of the difference in current through instruments 43 and 45 I may use the direct current measuring instrument 36 in the circuit with electrode 27 and source 41. The instrument 36 is preferably a ballistic instrument capable of indicating, over the cycle, the average direct current component through it, which will be a measure of earth polarization. When instrument 36 is depended upon, it is unnecessary to read the instruments 43 and 45.

I may alternately employ the measuring circuit shown in Fig. 8. Here the instrument 43 is replaced by a thermocouple 48 of such large heat capacity that it will respond only to the average of current through it, and the instrument 45 is replaced by a similar thermocouple of high heat capacity 49. These thermocouples are connected in opposition through direct current measuring instrument 50. The indication of instrument 50 is, then, a measure of the difference in current through thermocouples 48 and 49, which in turn measures the polarization of the earth. The balancing circuit 17 is omitted from Fig. 8 in the interest of clearness.

The intervals of time over which the unidirectional and alternating E. M. F.'s are applied may be varied from those represented in Fig. 7. The greater the interval during which the unidirectional E. M. F. is applied, the greater is the degree of polarization, and the polarization can also be increased by increasing the E. M. F. applied. Furthermore, it is not necessary that the unidirectional E. M. F. be applied during all of the interval that the alternating E. M. F. is unconnected. I may, for example, apply the unidirectional E. M. F. only after an interval of time has elapsed since the disconnecting of the alternating E. M. F. and may apply the alternating E. M. F. again only after another interval has elapsed following the disconnecting of the unidirectional E. M. F. These time intervals are flexible and may be varied to study the polarization effects in different stages.

In practical field work I preferably measure the polarization of the earth as above described with one spacing of the electrodes connected with the earth, then change the electrode spacing and again measure the polarization. The object of this procedure is to cover different areas and different depths. As the spacing between the electrodes is increased the depth of strata within the earth which can contribute to the polarization is greater. By this procedure, then, the structure of the underlying earth may be indicated by the polarization effects obtained for different electrode spacings. Either the electrodes 26 and 27 of the measuring circuit, alone, may be changed from one spacing to another, or both electrodes 26 and 27 and also electrodes 21 and 22 may be changed from one spacing to another. In Fig. 4, as the spacing of the electrodes is increased, the polarization as indicated in the stratum 46 will, at some spacing, become noticeable, and as the spacing is still further increased the indicated polarization in the zone 47, which, for example, may be an oil-bearing zone, will become noticeable. And because the polarization characteristics of oil-bearing earth are different from the surrounding non-oil-bearing earth, the stratum 47 of oil-bearing earth may in this manner be recognized, and its approximate depth indicated by the electrode spacing at which its effect becomes noticeable.

An alternative method of field operation by which underground structure may be determined from polarization measurements is that illustrated in Fig. 9. I may employ a polarizing circuit including spaced electrodes 51 and 52 electrically connected to the earth, a switch 53 and a source of direct current 54, the positive terminal of source 54 being connected to electrode 51; and another polarizing circuit having electrodes 55 and 56 electrically connected to the earth, spaced from one another and preferably spaced a relatively long distance from the electrodes of the first polarizing circuit, the second circuit also including a switch 57 and a source of direct current 58, the negative terminal of the source 58 being connected to the electrode 55. Preferably located between the above-mentioned polarizing circuits and their electrodes are three additional non-polarizing electrodes 59, 60, and 61 which are connected in a measuring circuit. Connected to electrode 59 is the direct current measuring instrument 62, the other terminal of which is connected to a branched circuit having in one branch the source of unidirectional current 63 with its positive pole connected to the instrument 62 and in the other branch the source of unidirectional current 64 with its negative pole connected to the instrument 62. The negative pole of source 63 is connected to relay contact 65 and the positive pole of source 64 is connected to relay contact 66. To the electrode 61 is connected the direct current measuring instrument 67, the other terminal of which is connected to a branched circuit having in one branch the source of unidirectional current 68 with its positive pole connected to the instrument 67 and in the other branch a source of unidirectional current 69 with its negative pole connected to the instrument 67. The negative pole of source 68 and the positive pole of source 69 are connected to the relay contacts 70 and 71, respectively. The relay 72, which is shown diagrammatically, operates in such a manner as to alternately connect, first, contacts 65 and 70 to the electrode conductor 73, and then contacts 66 and 71 to conductor 73 leading to central electrode 60.

It will be noted that when switches 53 and 57 are closed, polarization electromotive forces will build up in the polarizing circuits due to the concentration of positively charged ions nearest the electrodes 52 and 55 and of negatively charged ions nearest the electrodes 51 and 56. When the relay 72 connects contacts 65 and 70 with central electrode 60, the source 63 sends a current between electrodes 59 and 60 through the earth in such a way that the positive charges concentrated relatively near electrode 52 hinder its passage. In the same way a current is sent through the earth from electrode 61 to electrode 60 in such a direction that the concentrated positive charges nearest electrode 55 hinder its passage. When the relay 72 connects the contacts 66 and 71 to central electrode 60, the currents through the two halves of the measuring circuit are in the reverse direction and are assisted in their passage by the concentrated earth charges. Thus, when contacts 66 and 71 are connected to electrode 60, the instruments 62 and 67 both indicate greater currents than when contacts 65 and 70 are connected to electrode 60, and the difference in the currents under these two conditions are measures of the polarization existing in the earth on the two sides, respectively, of electrode 60. The instruments 62 and 67 are preferably of a ballistic type which causes them to indicate the average of the currents passing through them. The polarization, then, under electrode 59 will be indicated by instrument 62 and the polarization under electrode 61 will be indicated by instrument 67. The difference between the currents through these two instruments will be a measure of the difference in polarizations in these locations, respectively, and this difference will show difference in formation. Naturally the instruments 62 and 67 may be replaced by thermocouples connected in opposition, through a meter, following the principle shown in Fig. 8, to indicate on the meter the difference in polarization between the two areas. If, as in Fig. 9, the electrodes 52 and 59 are over a dome within which is a zone 47 of oil-bearing sand overlaid by a stratum 46 of non-oil-bearing earth, the polarization under these electrodes will be different from that under electrodes 55 and 61, for the positive ionic charges under electrode 59 are nearer the surface than are the positive charges under electrode 61, and will therefore be of more effect. The instrument 67 will, then, indicate a current which differs from the current indicated by instrument 62. In this way the character of underground structure may be indicated. Further, since the polarization characteristics of oil-bearing stratum 47 are different from those of stratum 46, the depth of these strata may be indicated by the electrode spacings at which these characteristics become noticeable. It will be obvious that this method and apparatus can be extended to simultaneously determine the earth polarization at a plurality of locations more than two in number. Another procedure is to move the electrodes 59, 60, and 61 closer to one polarizing circuit and away from the other until the polarization under the two halves of the measuring circuit is the same, and the amount of the shift from a central position required to effect equality will be a measure of the difference in polarizations.

An alternative method of procedure in the field is as illustrated in Fig. 10. Here, a single polarizing circuit is employed including the electrodes 76 and 77, electrically connected to the earth, a switch 78 and a source of unidirectional current 79. The same measuring circuit as used in Fig. 9 is employed except that since the polarizations measured by the two halves of the measuring circuit due to the polarizing circuit are in this case of opposite sign, the instrument 67 is reversed with respect to the connections thereto. With this arrangement, the difference in current indicated by instruments 62 and 67 is a measure of the difference in polarizations in the earth portions of the respective halves of the measuring circuit. The electrodes 59, 60, and 61 may be shifted to different positions between the polarizing electrodes as in the arrangement of Fig. 9.

In the arrangement of either Fig. 9 or Fig. 10, I may alternatively employ the measuring circuit of Fig. 11. To the central electrode 60 is connected a source of low frequency alternating current 80, and the other terminal of the source 80 is connected through relay switch 83 to a branched circuit, one branch of which includes the ballistic direct current measuring instrument 81 and the electrode 61, while the other branch includes the ballistic direct current measuring instrument 82 and the electrode 59. It will be clear from the description of the other circuits that the instrument 81 will measure the difference between the currents passing in opposite directions through the electrode 61, which in turn measures the polarization in the earth circuit between electrodes 60 and 61. In the same way, the instrument 82 measures the polarization in the earth circuit between electrodes 59 and 60. The relay switches in the polarizing and measuring circuits may be operated at intervals to connect the respective circuits as previously described.

In the circuits of Figs. 8, 9, 10, and 11, I preferably also employ the balancing circuit 17, as in Fig. 4 for the same purpose, as will be obvious, two balancing circuits 17 being employed in the case of Figs. 9, 10, and 11, with one balancing circuit in each of the two measuring circuits therein employed.

The low frequency alternating current source 80 employed in the circuit of Fig. 11 and the low frequency alternating current source 41 employed in the circuits of Fig. 6 and Fig. 8 may be of the construction shown in Fig. 12. A commutator 85 is provided with a large number of segments S, here shown for simplicity as only 24 in number. The larger the number of segments on the commutator, the more nearly continuous is the voltage at the output terminals. Between each two adjacent segments is connected an electrical resistance of fixed valve R. To opposite segments $S_1$ and $S_{13}$ of the commutator 85 I connect the opposite terminals of a source of direct current 86, the positive terminal being connected to segment $S_1$. The arm 87 carrying the brushes 88 and 89, insulated from one another, is adapted to rotate and cause the brushes 88 and 89 to bear on opposing segments and to successively contact all of the segments of the commutator. The brushes 88 and 89 are connected to collector rings 90 and 91, respectively, on which brushes bear to connect the rings to conductors 92 and 93, respectively. The conductors 92 and 93 are connected to the input of a power amplifier 94 which amplifies the alternating potential difference and delivers alternating current through the output conductors 95 and 96. These conductors 95 and 96 may be considered the terminals of the alternating current generators referred to in the circuits of Figs. 6, 8, and 11.

It will be observed that segment $S_1$ is positive with respect to segment $S_{13}$ by the amount of the voltage of the source 86, so that when brush 88 is connected to segment $S_1$ and brush 89 to $S_{13}$ conductor 92 is positive with respect to conductor 93 and the maximum potential difference exists between them. When the arm 87 has rotated through 180° the potential difference will again be maximum but the conductor 92 is then negative with respect to conductor 93. When the brush 88 is on segment $S_7$ and brush 89 is on segment $S_{19}$ the potential difference between the conductors 92 and 93 is zero. It will, then, be clear that as the arm 87 is rotated an alternating potential difference will be produced between the conductors 92 and 93 and hence also between the output conductors 95 and 96. Since the potential at each brush is dependent upon the potential drop between $S_7$ and the segment which the brush contacts in comparison to the whole potential drop from $S_1$ to $S_7$, the wave shape of the alternating potential difference produced may be made practically anything desired by making the resistances R of suitable value. For example, in the position of the arm 87 shown in Fig. 12, the arm makes an angle of 60° with the segments $S_7$ $S_{19}$, so if it is desired to produce a sine wave alternating current, the resistances must follow the following relation:

$$\frac{R_3+R_4+R_5+R_6}{R_1+R_2+R_3+R_4+R_5+R_6}=\text{sine }60°$$

and so on for the other positions of the rotating arm.

If an appreciable current is drawn from the brushes 88 and 89 the wave shape will be distorted because of the resulting potential drop in the resistances and it is for this reason that the amplifier 94 is provided, requiring practically no current to be drawn from the commutator. The frequency of the alternating current in conductors 95 and 96 is proportional to the speed of rotation of arm 87, so this arm is rotated through suitable gears by a motor of constant, but adjustable, speed.

An example of the type of relay which may be employed in the circuits above described is that illustrated in Fig. 13. Here a distributor 100 is provided, having segments W, X, Y, and Z adapted to be successively contacted by the brush 101 disposed at the end of an electrically insulating rotatable arm 103. The brush 101 is connected to collector ring 104 which is connected by a brush to conductor 106. The arm 103 is rotated at uniform speed through suitable gears by a constant, but adjustable, speed motor. Angles of turning of the arm, therefore, correspond to time intervals. The brush 101 is made of nearly the same width as that of the segments of the distributor, so that as the arm rotates, the brush is substantially always in contact with some segment. Now by connecting the various segments of the distributor to various circuits it is possible to connect the conductor 106 to these circuits for any desired interval of time, depending upon how many consecutive segments are connected to the same circuit and upon the speed of rotation.

Two such relays connected for synchronous rotation and properly oriented with respect to one another may be employed to perform the functions of relay switches 25—28 of Fig. 6, one distributor relay serving as relay switch 25 and the other as switch 28. In this case, assume the distributor relay to be connected to perform the function of relay switch 28. I may then connect conductor 107 to all of segments $X_1$ $X_2$, $X_3$, $Y_1$ $Y_2$, $Y_3$, $Z_1$ $Z_2$, $Z_3$, $W_1$ $W_2$, $W_3$, and connect conductor 106 to the $a$ terminal of switch 37 and conductor 107 to source 41, while the remaining segments are left unconnected. As the arm 103 rotates, then, connection is made between conductors 106 and 107 during the time intervals when the brush contacts any of the connected segments, but when the brush contacts the unconnected segments, connection between the conductors 106 and 107 is broken. A similar distributor relay may be synchronously operated with segments so connected together that connection is made between its brush and the connected circuits when the circuit 106 and 107 is open and the brush of this second distributor relay may be connected to electrode 21 and its segments to the positive terminal of source 23. In this manner I may switch on and off the polarizing and measuring circuits of Fig. 6 as previously described.

Should I choose to use only one electrode in place of electrodes 22 and 27, connecting their associated circuits together, and uniting electrodes 21 and 26, I may employ only one distributor relay. In this case I connect the brush to the electrode taking the place of electrodes 21 and 26. It will then be obvious that by connecting segments $X_1$ $X_2$, $X_3$, $Y_1$ $Y_2$, $Y_3$, $Z_1$ $Z_2$, $Z_3$, $W_1$ $W_2$, $W_3$, together and to the positive terminal of source 23 and by connecting the remaining segments together and to source 41, the electrode is alternately connected to the source 23 and to the source 41, or that by leaving certain segments unconnected it is possible to cause corresponding time intervals to exist in which no electromotive force is in circuit with the electrodes.

It will be clear that in a similar manner distributor relays as above described may be applied to serve the functions of relay switches 25, 28, 30, 31 and 37 in the circuit of Fig. 4, and of relay switches 25, 184, 185, 186, 187, and 188 in the circuit of Fig. 15.

A complete circuit including thyratron tubes and associated relay circuits, adapted to perform the functions of the simplified circuit of Fig. 4, is diagrammatically illustrated in Fig. 14. In this circuit are employed seven thyratron tubes 120, 121, 122, 123, 124, 125 and 126 connected in circuit and controlling the seven relays 127, 128, 129, 130, 131, 132 and 133, respectively, to cause operation of these relays to connect the polarizing and measuring circuits at the proper times. All of these relays except relay 133 are three-pole, double-throw relays, and relay 133 is a double-pole, double-throw relay. Each of the thyratrons is operatively connected to its associated relay in the same manner. A source 134 of direct current is connected in parallel with each of the potentiometers 135, 136, 137, 138, 139, 140 and 141, the positive terminal of each potentiometer being connected to the cathode of its associated thyratron, and the movable arm of each potentiometer being connected to the grid of its associated thyratron. The cathodes of all the thyratrons are connected together and to the negative terminal of the source 142 of direct current. Electrical heaters for the cathodes of the thyratron tubes are suitably energized from a source of electric current. The heaters and their energizing currents are omitted from the drawings in the interest of clearness. The anodes of the thyratrons 120, 121, 122, 123, 124, 125 and 126 are connected through the operating coils 143, 144, 145, 146, 147, 148 and 149 of the respective associated relays and through variable resistances 150, 151, 152, 153, 154, 155 and 156, respectively, to the upper terminal of the left-hand switch of each relay, respectively. The switch arm of the left-hand switch of the first relay 127 is connected to the positive terminal of source 142. The lower terminal of the left-hand switch in each relay is connected to the switch arm of the left-hand switch of the succeeding relay. Thus, the left-hand switch of each relay controls the anode circuit as above described, the normal position of the switch arms of each relay being up, as shown. A condenser 157 is connected between the cathode of thyratron 120 and a point between resistance 150 and relay coil 143. Similar condensers 158, 159, 160, 161, 162, 163, but not necessarily of the same capacity, are connected similarly in the circuits of thyratrons 121, 122, 123, 124, 125, and 126, respectively.

The operation of each of the thyratron circuits may be understood from a consideration of the operation of the first. With the relay 127 in normal position, shown in Fig. 14, the condenser 157 will be charged through resistance 150, taking a time dependent upon the product of the resistance 150 and the capacity of condenser 157. When a certain potential difference across the condenser 157 is reached, the thyratron 120 will break down and current will pass through the tube from anode to cathode and, therefore, through operating coil 143 of relay 127 causing the relay to operate and contact the switch arms to the lower contacts until the relay is reset in normal position. When the left-hand switch of relay 127 contacts its lower contact, the electromotive force of source 142 will be thrown across resistance 151 and condenser 158, eventually causing thyratron 121 to break down, resulting in the operation of relay 128. The operation of relay 128 energizes the succeeding thyratron circuit and the relays 129, 130, 131, 132 and 133 successively operate in the same manner as described. The time interval between energization of each thyratron circuit and operation of its associated relay may be varied by changing the resistance in each respective circuit corresponding to resistance 150 in the circuit of thyratron 120.

After all the relays have operated and their switch arms are all brought to their lower positions, the relays are preferably automatically reset to their normal positions by the means now to be described. The switch arms of the middle switches of relays 127, 128, 129, 130, 131, 132, and the switch arm of the right-hand switch of relay 133 are all connected together, and through the reset coil 164 of relay 133, and the resistor 165, to one terminal of the battery 166. The other terminal of battery 166 connects through switch 167 to the lower contact of the right-hand switch of relay 133. The lower contacts of the middle switches of relays 127, 128, 129, 130, 131, and 132 are connected through reset coils 168, 169, 170, 171, 172 and 173, respectively, of relays 127, 128, 129, 130, 131, and 132 respectively, to the same terminal of source 166 to which resistor 165 is connected. Resistors 174, 175, and 176 are inserted in series with reset coils 172, 173, and 170, the resistors 165, 174, 175, and 176 being inserted to delay the resetting of the relays in whose reset circuits they are placed. It will be clear that when the switch arms of all the relays except relay 133 are in their lower positions, the operation of relay 133 will energize the reset coils of all the relays. The reset coils are adapted, upon being energized, to reset the switch arms of their associated relays in the normal, or upper, position. In this manner, the sequence of events controlled by the relays is automatically repeated an indefinite number of times. If, however, it is desired to stop the operation of the system after relay 133 has operated, it is only necessary to break the resetting circuit by opening the switch 167.

The connections of the relays to the polarizing and measuring circuits by which the operation of these circuits are controlled will now be described. The electrode 21 of the polarizing circuit is connected to the switch arm of the right-hand switch of relay 128, while the electrode 22 of the polarizing circuit is connected through switch 24 and direct current source 23 to the switch arm of the right-hand switch of relay 129. The lower contact of the right-hand switch of relay 128 is connected to the upper contact of the right-hand switch of relay 129. The electrode 26 of the measuring circuit is connected to the switch arm of the right-hand switch of relay 127, the lower contact of which is connected to the switch arm of the right-hand switch of relay 131. The electrode 27 of the measuring circuit is connected through the balancing circuit 17 and the meter 36 to the meters 33 and 35, which in turn, connect to the positive terminal of source 32 and to the negative terminal of source 34, respectively. The upper contact of the right-hand switch of relay 127 is connected through meter 40 to a point between meter 36 and the balancing circuit 17. The lower contact of the right-hand switch of relay 130 is connected to the upper contact of the right-hand switch of relay 131, and the lower contact of the right-hand switch of relay 131 is connected to the upper contact of the right-hand switch of the relay 132. The positive terminal of source 34 is connected to the switch arm of the right-hand switch of relay 130, and the negative terminal of source 32 is connected to the switch arm of the right-hand switch of relay 132.

In operation, assume that all relays have just been reset to their normal positions with all switch arms up. The electrodes 26 and 27 will then be connected in circuit with meter 40 and balancing circuit 17 for a period of time $t_6$ $t_7$ (Fig. 5) during which normal earth currents are balanced out. The duration of the interval $t_6$ $t_7$ may be varied by changing the value of resistance 150. The operation of relay 127 initiates the period $t_7$ $t_8$ the duration of which may be varied by changing the value of resistance 151. The operation of relay 128 closes the polarizing circuit and initiates a period similar to $t_1$ $t_2$ whose duration may be varied by changing resistance 152. The operation of relay 129 opens the polarizing circuit and initiates a period similar to $t_1$ $t_2$ the duration of which may be varied by changing the value of resistance 153. The operation of relay 130 connects the source 34 and meter 35 in the measuring circuit and initiates the period $t_3$ $t_4$ the duration of which may be varied by changing the value of resistance 154. The operation of relay 131 disconnects the source 34 and meter 35 and connects the source 32 and meter 33 in the measuring circuit, initiating the period $t_4$ $t_5$ the duration of which may be varied by changing the value of resistance 155. The operation of relay 132 disconnects the source 32 and meter 33 and initiates the period $t_5$ $t_6$ the duration of which may be varied by changing the value of resistance 156. The operation of relay 133 resets all the relays to normal position, which connects the balancing circuit, and a new cycle of operations is begun. In this manner the above described sequence of events may be repeated indefinitely.

It will be understood that those skilled in the art may devise other apparatus from that herein described for carrying out the methods of my invention, and that various variations in the methods disclosed herein may also be made without departing from the spirit of the invention defined in the appended claims.

I claim as my invention:

1. The method of geophysical prospecting comprising polarizing the earth for a limited time period, applying electromotive force to the earth during two limited time periods during discharge of the earth polarization following termination of said polarizing period, and measuring earth polarization by observing the difference in currents flowing in circuit with the electromotive force during said two time periods.

2. A method of geophyhical prospecting comprising polarizing the earth, successively applying to the earth electromotive forces of opposite direction, and measuring the currents in circuit with said electromotive forces.

3. A method of geophysical prospecting comprising polarizing the earth, successively applying to the earth electromotive forces of opposite direction, and indicating the difference between the currents in circuit with said electromotive forces.

4. A method of geophsyical prospecting comprising inducing polarization in the earth, applying to the earth in immediate succession and for substantially the same time period electromotive forces of substantially the same value but of opposite direction, and comparing the currents in the circuits of said electromotive forces.

5. A method of geophysical prospecting comprising polarizing the earth by application thereto of a unidirectional electromotive force for a limited time period, and measuring the resultant earth polarization at each of a plurality of times during discharge of said polarization.

6. A method of geophysical prospecting comprising repeatedly polarizing the earth by application thereto of an intermittent unidirectional electromotive force, and successively measuring the resultant earth polarization at a plurality of times within the discharge intervals between periods of application of said electromotive force.

7. A method of geophysical prospecting comprising repeatedly polarizing the earth by application thereto of an intermittent unidirectional electromotive force, and successively measuring the resultant earth polarization at a plurality of times within the discharge intervals between periods of application of said electromotive force, each of said measurements comprising applying to the earth in succession electromotive forces of opposite direction and comparing the currents in the circuits of said last-mentioned electromotive forces.

8. A method of geophysical prospecting comprising intermittently polarizing the earth through the intermittent application of a unidirectional electromotive force, applying to the earth an alternating electromotive force in intervals between application of said unidirectional electromotive force, and measuring the current flowing in each direction in the circuit of said alternating electromotive force.

9. A method of geophyhical prospecting comprising intermittently applying to the earth a unidirectional electromotive force to induce polarization therein, applying to the earth an alternating electromotive force in intervals between application of said unidirectional electromotive force, the time between reversals of said alternating electromotive force being long compared to the time of each application of said unidirectional electromotive force, and measuring the current flowing in each direction in the circuit of said alternating electromotive force.

10. A method of geophysical prospecting comprising intermittently applying to the earth a unidirectional electromotive force to induce polarization therein, applying to the earth an alternating electromotive force in intervals between application of said unidirectional electromotive force, and indicating the difference between the currents flowing in opposite directions in the circuit of said alternating electromotive force.

11. A method of geophysical prospecting comprising inducing polarization of the earth at spaced locations, and simultaneously measuring the polarization of the earth at a plurality of locations intermediate said first-mentioned locations.

12. Apparatus for geophysical prospecting comprising a source of direct current, two additional sources of direct current, means for intermittently connecting said first source in circuit with the earth to induce polarization therein and for successively connecting said additional sources with opposite polarity in circuit with the earth in intervals between periods of connection of said first source, and means for measuring the difference in currents flowing in the circuits of said additional sources.

13. Apparatus for geophysical prospecting comprising a source of direct current, a source of alternating current, means for intermittently connecting said first source in circuit with the earth to induce polarization therein and for connecting said source of alternating current in circuit with the earth in intervals between periods of connection of said source of direct current, and means for measuring the difference in currents flowing in each direction from said alternating current source.

14. A method of geophysical prospecting comprising inducing electrolytic polarization in the earth, applying at the same time to each of two different portions of the earth successive electromotive forces of opposite direction, and measuring the differences between the currents in the circuits of said successive electromotive forces.

GENNADY POTAPENKO.